US006963863B1

(12) United States Patent
Bannon

(10) Patent No.: US 6,963,863 B1
(45) Date of Patent: Nov. 8, 2005

(54) NETWORK QUERY AND MATCHING SYSTEM AND METHOD

(76) Inventor: Thomas Bannon, 5111 Purdue Ave., Dallas, TX (US) 75209

( * ) Notice: Subject to any disclaimer, the term of this patent is extended or adjusted under 35 U.S.C. 154(b) by 0 days.

(21) Appl. No.: 09/407,555

(22) Filed: Sep. 28, 1999

(51) Int. Cl.⁷ .............................................. G06F 17/30
(52) U.S. Cl. ................... 707/3; 707/10; 707/4; 707/5; 707/6; 715/513; 715/514
(58) Field of Search .............................. 705/27, 37, 35, 705/8; 707/3, 10, 4, 5, 6; 709/225, 229; 715/513, 514

(56) References Cited

U.S. PATENT DOCUMENTS

| | | | | |
|---|---|---|---|---|
| 5,592,375 A | * | 1/1997 | Salmon et al. | 705/7 |
| 5,864,871 A | * | 1/1999 | Kitain et al. | 707/104 |
| 5,873,071 A | * | 2/1999 | Ferstenberg et al. | 705/37 |
| 5,897,620 A | * | 4/1999 | Walker et al. | 705/5 |
| 5,924,090 A | * | 7/1999 | Krellenstein | 707/5 |
| 5,983,199 A | * | 11/1999 | Kaneko | 705/26 |
| 6,009,422 A | * | 12/1999 | Ciccarelli | 707/4 |
| 6,012,053 A | * | 1/2000 | Pant et al. | 707/3 |
| 6,012,098 A | * | 1/2000 | Bayeh et al. | 709/246 |
| 6,041,308 A | * | 3/2000 | Walker et al. | 705/14 |
| 6,055,569 A | * | 4/2000 | O'Brien et al. | 709/223 |
| 6,065,001 A | * | 5/2000 | Ohkubo et al. | 707/3 |
| 6,125,391 A | * | 9/2000 | Meltzer et al. | 709/223 |
| 6,226,675 B1 | * | 5/2001 | Meltzer et al. | 709/223 |

OTHER PUBLICATIONS

Adone Classified Network: AdOne introduces DisplayOne, the first affordable, turnkey solution for publishing display ads on the Web, by Business Editors & technology Industry Writers, Jun. 1997, pp. 1–2.*

Craske et al, "A property based clustering approach for the CORBA Trading service", IEEE, Jun. 1999, pp. 517–525.*
Andrew et al., "Editorial and Advertisement Systems", the Seybold report on publishing system Jul. 29, 1996, V25, n21 P3(51).*
OBJS Technical Note, "A Rough Guide to Sun's Jini", P. Pazandak, Aug. 1998, www.objs.com/agility/tech–reports/9808–Jini–summary–html, 3 pages.
A Reference Model for Trader–Based Distributed Systems Architecture, V. Vasudevan, Jan. 1998, www.objs.com/survey/trader–reference–model.html, 5 pages.
Tutorial on ODP Trading Fucnction*, M. Bearman, Revised Feb. 1997 to align with ISO/IEC IS 13235:1/Draft Rec. X.950:1 (1997), www.dstc.edu.au/Products/CO . . . ading__ Service/Tutorial/trtute.html, 20 pages.
OMG Trader, CORBA CosTrader, Chapter 16 "Trading Object Service Specification", Mar. 1997, www.omg.org/corba/sections.html pp (16–1)–(16–100).
IonaSphere 26, Mar. 1997, 126–E "Beta Release of Orbix-Trader", www.iona.com/info/aboutus/ionasphere/ionasphere26.html, 10 pages.

(Continued)

*Primary Examiner*—Jean M. Corrielus
(74) *Attorney, Agent, or Firm*—The Law Firm of H. Dale Langley, Jr., P.C.

(57) ABSTRACT

A method for finding a trading ad on a network includes steps of receiving a query, devising a query string from the query, sending the query string to a search engine of the network, searching via the search engine to find the trading ad, returning a search result by the search engine, sifting and extracting the trading ad from the search result, and matching and ranking the trading ad with respect to the query. A trader performs the steps of receiving, devising, sending, sifting and extracting, and matching and ranking. The trader is scalable such that the network can be the Internet, and the trader can be a computer software program.

3 Claims, 2 Drawing Sheets

OTHER PUBLICATIONS

Trader Tutorial, M. Bearman, Tutorial on ODP Trading Function, "Trader Papers", www.dstc.edu.au/Products/CORBA/Trading_Service/Papers, 4 pages.

WebTrader: Discovery and Programmed Access to Web-Based Services, V. Vasudevan and T. Bannon, www.objs.com/agility/tech-reports/9812-web-trader-paper/WebTraderPaper.html (Draft), 18 pages.

WebTrader: Discovery and Programmed Access to Web-Based Services, V. Vasudevan and T. Bannon, www.ogjs.com/agility/tech-reports/9904-WebTraderWWW8Poster.html, 2 pages.

A Short Description of the OBJS Web Trader, Object Services Architectures, T. Bannon, Sep. 30, 1998, www.objs.com/OSA/WebTrader-Desc.html, 4 pages.

Overview of CORBA, www.cs.wustl.edu/~schmidt/corba-overview.html, 3 pages.

CORBA for Beginners, www.omg.org/corba/beginners.html, 7 pages.

What is CORBA?, www.omg.org/corba/whatiscorba.html, 4 pages.

CORBA Overview, Chap. 2, www.infosys.tuwien.ac.at/Research/Corba/OMG/arch2.html, 12 pages.

* cited by examiner

NETWORK QUERY AND MATCHING SYSTEM AND METHOD

BACKGROUND OF THE INVENTION

The present invention relates generally to computers and networks and, more particularly, relates to network query and matching of widely distributed objects, such as over the Internet.

In common computing and software parlance "objects" are units of code that are discrete software components. These objects often model real-world objects, although sometimes programmers create objects specifically for things that it is desired to compute. Conventionally, each object is made according to a template of a generic class of object, the template being defined so that objects can share models and reuse the class definitions in their code. Each object is an instance of a particular class or subclass with the class's own methods or procedures and data variables. Other software components send messages to objects with requests. The objects send other messages back with their responses. In order to assure that disparate objects on disparate systems and platforms will interact together in a useful way, a standardized object programming architecture and interface, such as the Common Object Request Broker Architecture (CORBA) and the Interface Definition Language (IDL) each of the Object Management Group (OMG), has been defined.

In CORBA and IDL, a software system known as a "trader" is sometimes employed. The trader matches queries with resources. In operation with CORBA objects, for example, a CORBA Trader allows a client to dynamically query for provider resources. The query searches the provider resources for occurrence of certain object characteristics, as specified in the particular query, and returns objects having the certain characteristics. With the disparate clients and provider resources, having disparate architecture and systems, of most CORBA environments, the CORBA and IDL standard allows for interoperability of the objects, and requisite communicability among systems for such interoperability.

Although CORBA provides certain advantages in conventional object-oriented environments, many other environments, which are traditionally not strictly object-oriented in conformance to particular object standards (e.g., non-CORBA objects), would benefit from interoperability of models and schemes and trading of resources for such interoperability. Furthermore, it would be advantageous in such environments to allow for client queries with provider resources dynamically, so that hardcoded bindings in the client can be avoided, thus making clients more flexible and open to change in themselves or their operating environments. Another advantage would be presented if such trading can involve many different forms of data and information, for example, trading of data sources, such as databases, files, and images, as well as open-ended resource trading. Such trading would also be advantageous if it is not computing and communication resource intensive, yet employs scalable mechanisms. Such advantages would be highly beneficial to trading of resources over distributed networks, such as the Internet and the World Wide Web.

The present invention is an improvement and advance in the technology and art. It provides the foregoing advantages and others, including by serving as an agent for programs to find on the Internet and other distributed networks, various software components, data sources, or other objects the programs can connect to or make use of in some way.

SUMMARY OF THE INVENTION

An embodiment of the invention is a method for finding a trading ad on a network. The method includes steps of receiving a query, devising a query string from the query, sending the query string to a search engine of the network, searching via the search engine to find the trading ad, returning a search result by the search engine, sifting and extracting the trading ad from the search result, and matching and ranking the trading ad with respect to the query.

Another embodiment of the invention is a system for finding a trading ad on a network. The system includes a query-sending remote resource, a query-receiving trader, connected over the network to the remote resource, a query string devised by the trader, a search engine, connected to the network, for receiving the query string from the trader, over the network, and a trading ad, accessible over the network, and findable by the search engine, based on the query string.

Yet another embodiment of the invention is a system for searching a network for a trading ad corresponding to a user-supplied query tern. The network includes at least one search service. The system includes a trader for finding the at least one search service corresponding to the user-supplied query term and a client ad, derived by the trader, on the fly, from the user-supplied query term. The at least one search service is useable to locate other search services, Another embodiment of the invention is a trading advertisement. The trading advertisement includes an advertisement for a software interface. The software interface is an interface description language.

DETAILED DESCRIPTION

Figure 1:
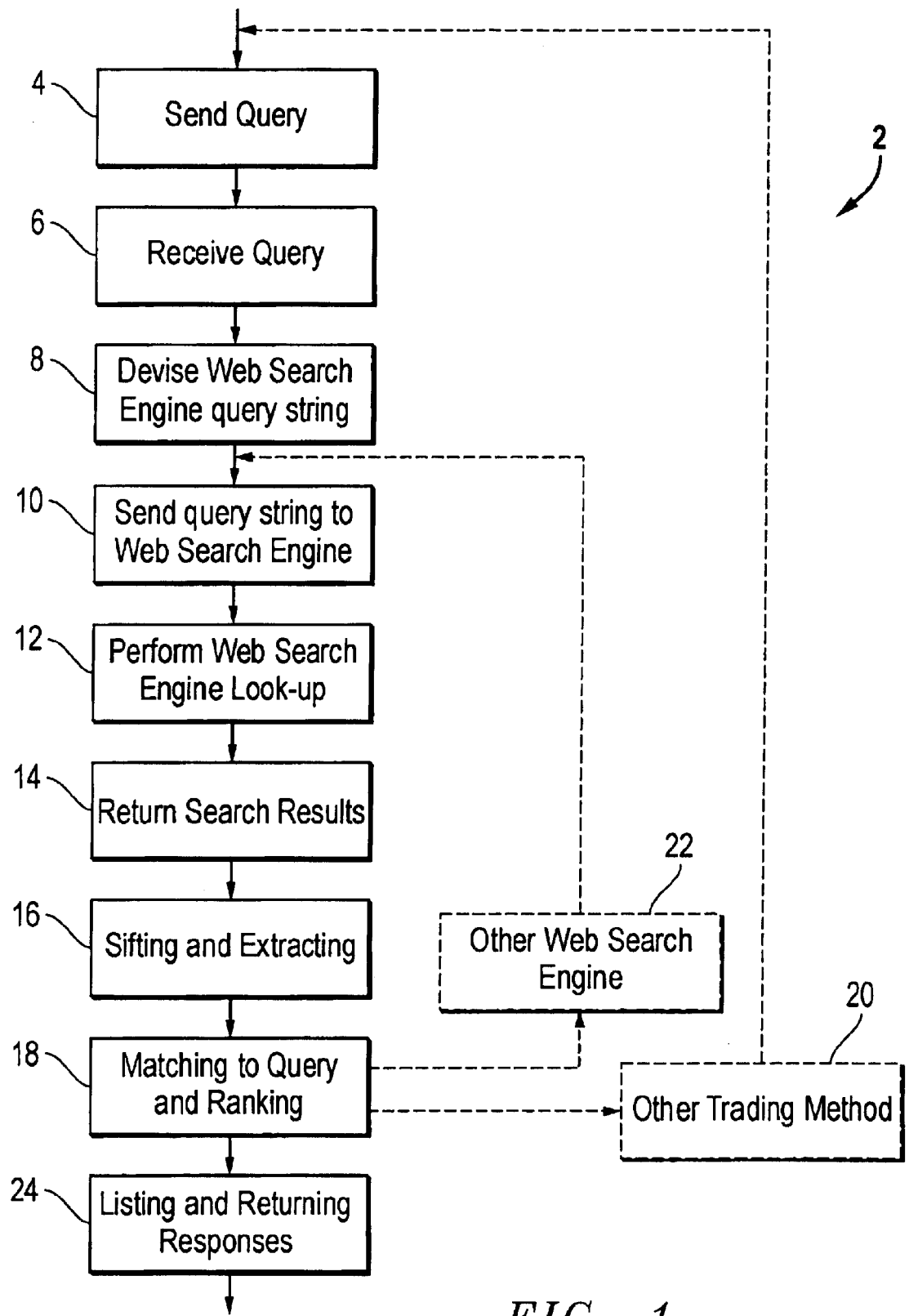
FIG. 1 is a flow chart of a method for finding a trading advertisement on a network using a trader, according to embodiments of the invention.

Referring to FIG. 1, a trading method 2 is initiated by a step 4 of sending a Query. In the step 4, a so-called "client" of a network, such as a computer on the Internet, sends the Query over the network. The Query, also referred to herein as a "client ad", states the details of a service or data source that the client seeks to find on the network.

In a step 6, the Query by the client is received by specialized software referred to herein as a "trader" or "WebTrader". The trader receives the Query (i.e., client ad) in the form sent by the client over the network.

The trader then derives a search query string from the Query in a step 8. In the step 8, the Query, of the form sent by the client, is employed to derive the search query string. The derived search query string is of a form useable by an appropriate network search engine, for example, a conventional World Wide Web search engine.

In a step 10, the trader sends the search query string, so derived from the Query, to the network search engine. The network search engine, in a step 12, employs the search query string to perform a network look-up search. The network look-up search is performed in conventional manner by the network search engine, such as by conventional look-up of indexed directory entries and best possible matching of the search engine directory entries.

In a step 14, the network search engine returns results of the search to the trader. The returned results are so-called "trading advertisements". Trading advertisements, in the case of Internet and World Wide Web operation, are special structures (as later described in more detail) contained within Web pages. Pages containing these trading advertisements are indexed by the network search engine in conventional manner.

After receiving the returned results, the trader, in a step 16, sifts through the results and extracts 0 to N (e.g., as specified by the client or otherwise for the particular application) trading advertisements from the resulting resources, e.g., Web pages, from the search. In a step 18, each returned trading advertisement is compared to the Query in a matching process. A score is determined for each trading advertisement in order to rank the relative degree of matching of the trading advertisement to the Query.

It is possible that certain trading advertisements will match-up with other traders or search engines. If matching trading advertisements for other traders and/or search engines are located, the original trader can invoke these to return still more trading advertisements generated by these other traders and search engines. A step 20 illustrates the invocation of another trader, and shows a return of the method 2 to the step 4 with respect to the other trader. Invocation of another search engine is illustrated by a step 22, which returns the method 2 to the step 10 with respect to the other search engine.

When the desired number (i.e., N) trading advertisement matches are found, or there are no other search engines or other traders that have been invoked, the original trader, in a step 24, generates a list of the resulting trading advertisements and returns the response list to the client that made the Query.

Figure 2:
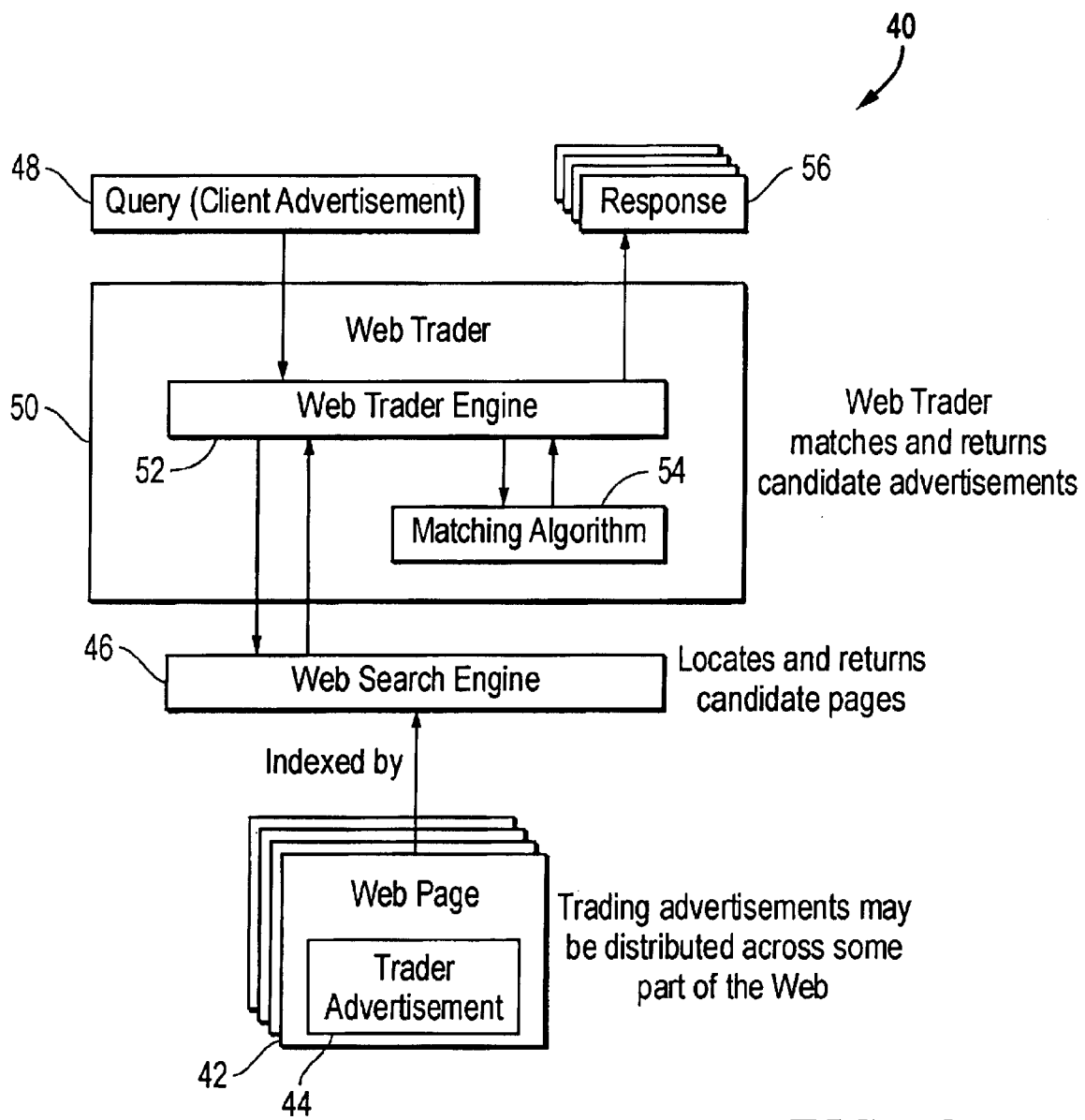
FIG. 2 is a block diagram of a trader, for finding a trading advertisement on a network, according to embodiments of the invention.

Referring to FIG. 2, a network trader system 40 determines and retrieves select trading advertisements, responsive to a client Query 48, relevant to a plurality of network resources (not shown in detail, but all communications occur over a network and through network communications resources, such as resources on the Internet or other distributed network). The system 40 includes pages 42, e.g., World Wide Web pages, and other resources. The pages 42 contain within them at least one trader advertisement 44 or some system 40 reference or means of access to such trading advertisement 44. The pages 42 are indexed, in conventional manner, by a search engine 46, for example, a conventional World Wide Web search engine that includes a directory of Web pages.

A client 48 of the system 40 is a communications resource connected to the network, such as a personal computer, personal digital assistant, software client, or other similar client application or device. The client 48 is capable of sending a Query (also termed client ad) over the network to a trader 50. The trader 50, for example, an Internet or World Wide Web trader, includes a trader engine 52 and a matcher 54. The trader engine 52 receives the Query from the client 48 and derives a properly formatted search query string, according to the formatting requirements of the search engine 46. The trader 50 is connected over the network to the search engine 46, and communicates the search query string to the search engine 46.

The search engine 46 locates and returns pages 42 that include or otherwise reference desired trader advertisements 44, pursuant to the particular search query string. Listings of returned pages 42 are delivered over the network by the search engine 46 to the trader engine 52. The matcher 54 of the trader 50 then compares the Query from the client 48 with the returned pages 42 and determines whether there is matching. The matcher 54 performs the matching pursuant to a matching algorithm (later described in more detail).

If there is sufficient matching as determined by the matcher 54 of the trader 50, the trader 50 returns a response 56 to the client 48. If additional matching trader advertisements are desired, as specified by the client 48 or otherwise, the trader engine 52 operates to invoke additional traders (not shown) or additional search engines (also not shown) prior to returning the response 56. Once there are no additional traders or search engines to be invoked or the desired number of matches are found, the trader 50 sends the response 56 to the client 48.

The core operation of the trader 50 is to find trading advertisements that match the user Query. Trading advertisements act as proxies for web-based (or otherwise accessible) resources and resource-seekers. In operation, a client 48 will hand the trader 50 a client ad (aka Query) giving details of a service or data source the client 48 seeks, and the trader 50 searches for trading advertisements 44 (i.e., also referred to as "provider ads") that match the client's 48 request as well as possible. The client 48 specifies the maximum number of matching provider ads it would like to receive, and the trader 50 does a best effort job to fulfill the request. The trader 50 can work in reverse and sideways as well: providers can look for clients and clients and providers can look for like clients and providers. These last two operations may end up of more interest to humans than programs, but that is not an obstacle as the trader 50 supports (directly or indirectly) human-accessible interfaces such as graphical user interfaces (GUIs) as well.

The following details the format of trading advertisements 44, where these advertisements 44 reside, how the trader 50 finds them, how it matches them and what clients do with the results the trader 50 returns.

Trading Advertisements

The primary data object of the method 2 and system 40 is a textual document, called the "trading advertisement" or "trading ad". A trading ad encapsulates the data necessary for the trader 50 to decide matches, such as between what a client seeks and what a provider offers, and can include information on how to use the provided resource, such as how to connect to the service or access the data source. The trader 50 resides on a server of a network, such as the Internet, and is software.

An exemplary embodiment of a trading ad is an XML document governed by two XML Document Type Definitions (DTDs)—TradingAdvert.dtd and a resource specific DTD. TradingAdvert.dtd defines the proper grammar of the trading ad as a whole, while the resource specific DTD defines the particular resource that is the object of the specific trading ad. In the exemplary embodiment, the trader 50 defines three resource specific DTDs: two software component service DTDs —CGI.dtd (for HTTP CGI components) and JavaRMI.dtd (for Java RMI components), and one generic data source DTD—datasource.dtd. Each of these DTDs is shown below, followed by an example of client and provider trading ads for a Java RMI component.

There are at least three ways the DTDs defining the trading advertisement and resource elements are useable in creating a trading ad. The first is that these DTDs can be used simply as a guide to writing the trading ad document, stating the tag set, attributes and other characteristics, but the DTD's are not actually pointed to (or included in) the trading ad. This minimum state is what is known as a "well-formed" XML document. Well-formedness (as defined in the XML specification—http://www.w3.org/TR/REC-xml) ensures that the trading ad can be read by an XML processor and unambiguously parsed to produce an element tree with properly defined attributes and values associated with each node in the tree. The second way to use a DTD in a trading ad is to include it directly in the trading ad, rather than merely point to the DTD via a URI. This can be done in the DOCTYPE element of the trading ad, where the content of the DTD can be placed between the [ ]'s in <!DOCTYPE name [ . . . ]. This area of the DTD is known as the "internal DTD subset". The third way to use the DTD in a trading ad, and particularly the one used in the examples below, is to point to the DTDs via URIs in the internal DTD subset, and include the DTDs content through the XML parameter entity mechanism (e.g., % parameterEntity;). These pointed-to documents formally exist in what is called the "external DTD subset".

The first DTD method results in the simplest implementation requirements and the least work to read and parse a trading ad (and thus the highest performance), but can allow incompletely defined or otherwise damaged trading ads to exist, as they are not validated against the DTD by an XML processor. The second method avoids bad trading ads due to the existence of the DTD, but requires reading and processing time to handle the DTD. The third method avoids bad trading ads like the second method, but requires retrieval of separate externally defined documents before beginning processing, unlike the first and second method's "standalone" ads. On the other hand, the third method allows central control of trading ad definitions such that any change in the ad definition is automatically inherited by all the participating trading ads.

The DTDs defined here will evolve over time as new capabilities are added. It is up to the trader 50 to handle trading ads using different versions of the DTDs, as well as different versions of DTD-less trading ads. Some or all of the current DTDs may end up re-defined as document schema definitions in XML Schema, a more general XML document definition language than DTDs that is presently being developed at the World Wide Web Consortium (W3C), a current Web technology standards group. Other possible evolutions of the DTDs include new or reworked sections in RDF (Resource Description Framework) and/or RDF Schema, also currently being developed at the W3C. RDF and RDF Schema are XML applications aimed at providing a formal model of machine-digestible metadata descriptions, and thus are relevant to trading ads. Other standards of interest to trading ads from bodies such as the W3C and the Internet Engineering Task Force (IETF) are likely to emerge as well, and are within the concepts of the present invention.

An example trading ad and the third method of using DTDs is illustrated as follows:

EXAMPLE

```
<!-- TradingAdvert.dtd -->
<?xml version="1.0" ?>
<!ELEMENT TradingAdvertisement (searchKeywords?, metadata?, resource)
<!ATTLIST TradingAdvertisement
    title   CDATA            #IMPLIED
    type    (client | provider)  #REQUIRED
<!ELEMENT searchKeywords (#PCDATA)*
<!ELEMENT metadata (mustHave?, reallyWant?, wouldLike?, mdata*, wtMatchCode?)
<!ELEMENT mustHave (mdata*)
```

-continued

```
<!ELEMENT reallyWant (mdata*)
<!ELEMENT wouldLike (mdata*)
<!ELEMENT mdata EMPTY
<!ATTLIST mdata
    name       CDATA                                   #REQUIRED
    value      CDATA                                   #REQUIRED
    valueType  (string | integer | decimal | boolean)  "string"
    dontCare   (true | false)                          "false"
<!ELEMENT wtMatchCode (#PCDATA)*
<!ATTLIST wtMatchCode
    uri        CDATA                                   #IMPLIED
    language   CDATA                                   "java"
    encoding   (uuencode | base64 | none)              "base64"
<!ELEMENT resource ANY
<!-- CGI.dtd -->
<?xml version="1.0" ?>
<!ELEMENT CGI (queryStringName*, connectPoint+)
<!ATTLIST CGI
    scriptName    NMTOKEN                       #REQUIRED
    pathInfo      CDATA                         #IMPLIED
    requestMethod (GET | POST | GET-POST)       "GET-POST"
<!ELEMENT queryStringName (allowedValue*, defaultValue?)
<!ATTLIST queryStringName
    name       NMTOKEN                                 #REQUIRED
    valueType  (string | integer | decimal | boolean)  "string"
<!ELEMENT allowedValue EMPTY
<!ATTLIST allowedValue
    value CDATA #REQUIRED
<!ELEMENT defaultValue EMPTY
<!ATTLIST defaultValue
    value CDATA #REQUIRED
<!ELEMENT connectPoint EMPTY
<!ATTLIST connectPoint
    name NMTOKEN   #IMPLIED
    uri  CDATA     #REQUIRED
<!-- JavaRMI.dtd -->
<?xml version="1.0" ?>
<!ELEMENT JavaRMI (derivedFrom*, method+, connectPoint+)
<!ATTLIST JavaRMI
    name         NMTOKEN   #REQUIRED
    wtMatchSpec  CDATA     "derivedFrom=matchEqualEA,
                            method=matchEqualEA"
<!ELEMENT derivedFrom EMPTY
<!ATTLIST derivedFrom
    interfaceName NMTOKEN   #REQUIRED
    uri           CDATA     #IMPLIED
<!ELEMENT method (parameter*, exception*)
<!ATTLIST method
    name        NMTOKEN  #REQUIRED
    returnType  NMTOKEN  #REQUIRED
<!ELEMENT parameter EMPTY
<!ATTLIST parameter
    name       NMTOKEN         #REQUIRED
    type       NMTOKEN         #REQUIRED
    direction  (in | out | inout)  #REQUIRED
<!ELEMENT exception EMPTY
<!ATTLIST exception
    name NMTOKEN #REQUIRED
<!ELEMENT connectPoint EMPTY
<!ATTLIST connectPoint
    name NMTOKEN   #IMPLIED
    uri  CDATA     #REQUIRED
<!-- datasource.dtd -->
<?xml version="1.0" ?>
<!ELEMENT datasource (mimeType? typeDef? access)
<!ELEMENT mimeType (contentType)
<!ELEMENT contentType EMPTY
<!ATTLIST contentType
    content CDATA #REQUIRED
<!ELEMENT typeDef (xmlDTD | xmlSchema | rdf | rdfSchema | custom)
<!ELEMENT xmlDTD EMPTY
<!ATTLIST xmlDTD
    uri          CDATA   #REQUIRED
    wtMatchSpec  CDATA   "uri=matchRef"
<!ELEMENT xmlSchema EMPTY
<!ATTLIST xmlSchema
    uri          CDATA   #REQUIRED
    wtMatchSpec  CDATA   "uri=matchRef"
<!ELEMENT rdfSchema EMPTY
```

-continued

```
<!ATTLIST rdfSchema
    uri          CDATA    #REQUIRED
    wtMatchSpec  CDATA    "uri=matchRef"
<!ELEMENT rdf EMPTY>
<!ATTLIST rdf
    uri          CDATA    #REQUIRED
    wtMatchSpec  CDATA    "uri=matchRef"
<!ELEMENT custom EMPTY>
<!ATTLIST custom
    uri          CDATA    #REQUIRED
    wtMatchSpec  CDATA    "uri=matchRef"
<!ELEMENT access (file* ftp* http* net* email* database*)>
<!ELEMENT file EMPTY>
<!ATTLIST file
    filename CDATA #IMPLIED
<!ELEMENT ftp EMPTY>
<!ATTLIST ftp
    host       CDATA    #IMPLIED
    port       CDATA    #IMPLIED
    directory  CDATA    #IMPLIED
    filename   CDATA    #IMPLIED
    username   CDATA    #IMPLIED
    password   CDATA    #IMPLIED
<!ELEMENT http EMPTY>
<!ATTLIST http
    url        CDATA    #IMPLIED
    username   CDATA    #IMPLIED
    password   CDATA    #IMPLIED
<!ELEMENT net EMPTY>
<!ATTLIST net
    host       CDATA    #IMPLIED
    port       CDATA    #IMPLIED
    username   CDATA    #IMPLIED
    password   CDATA    #IMPLIED
<!ELEMENT email EMPTY>
<!ATTLIST email
    to         CDATA    #IMPLIED
    subject    CDATA    #IMPLIED
    body       CDATA    #IMPLIED
<!ELEMENT database EMPTY>
<!ATTLIST database
    uri         CDATA                               #IMPLIED
    accessMethod (jdbc | odbc | custom | CDATA)     #IMPLIED
    username    CDATA                               #IMPLIED
    password    CDATA                               #IMPLIED
```

An Example Java RMI Client Ad

```
<?xml version="1.0" standalone="no" ?>
<!DOCTYPE TradingAdvertisement
[
<!ENTITY % tradingAd
"http://www.objs.com/WebTrader/v1.0/TradingAdvert.dtd"
%tradingAd;
<!ENTITY % resource "http://www.objs.com/WebTrader/v1.0/JavaRMI.dtd"
%resource;
]
<TradingAdvertisement type="client"
    <searchKeywords
        JavaRMIClientTradingAd, Cinterface JavaRMI, CinterfaceName
        RMITimeService, CderivedFrom Remote, CclockResolution
        seconds, CserviceCost free,
    </searchKeywords>
    <metadata
        <mustHave
            <mdata name="clockResolution" value="seconds"/
        </mustHave>
        <reallyWant
            <mdata name="serviceCost" value="free"/
        </reallyWant>
    </metadata>
    <resource
        <JavaRMI name="RMITimeService"
            <derivedFrom interfaceName="Remote"/
```

-continued

```
            <method name="getTime" returnType="String"
                <parameter name="timeZone" type="String"
                    direction="in"/
                <exception name="RemoteException"/
            </method>
        </JavaRMI>
    </resource>
</TradingAdvertisement>
</xml>
```

An Example Java RMI Provider Ad

```
<?xml version="1.0" standalone="no" ?>
<!DOCTYPE TradingAdvertisement
[
<!ENTITY % tradingAd
"http://www.objs.com/WebTrader/v1.0/TradingAdvert.dtd"
%tradingAd;
<!ENTITY % resource "http://www.objs.com/WebTrader/v1.0/JavaRMI.dtd"
%resource;
]
<TradingAdvertisement type="provider"
    <searchKeywords
        JavaRMIProviderTradingAd, Pinterface JavaRMI,
        PinterfaceName
        RMITimeService, PderivedFrom Remote, PclockResolution
        seconds, PserviceCost free,
    </searchKeywords>
    <metadata
        <mdata name="clockResolution" value="seconds"/
        <mdata name="serviceCost" value="free"/
    </metadata>
    <resource
        <JavaRMI name="RMITimeService"
            <derivedFrom interfaceName="Remote"/
            <method name="getTime" returnType="String"
                <parameter name="timeZone" type="String"
                    direction="in"/
                <exception name="RemoteException"/
            </method>
            <connectPoint uri="rmi://dante/RMITimeServer"/
        </JavaRMI>
    </resource>
</TradingAdvertisement>
```

As can be seen in the example from the DOCTYPE tag, the trading ads are composed of two DTDs, which specify the grammar of the trading ads, the tags and attributes. In an exemplary embodiment, a trading ad, represented in XML, has three main sections, searchKeywords, metadata, and resource. The searchKeywords are a mechanism for exposing information about the trading ad to a web search engine crawler when the trading ad is embedded in an HTML document. The way the trading ad grammar is defined by the DTDs embeds all the data of the trading ad inside various ad-specific XML tags, except in the case of the searchKeywords. Since none of the ad-specific tags are part of the official HTML grammar, they are ignored by HTML and its crawlers, and only the content of the searchKeywords is (possibly) indexed as keywords for the embedding page. These keywords could alternatively be replicated in META tags in the HEAD section of an HTML page, but some web crawlers specifically avoid indexing pages using this information due to page spamming concerns. The keywords are generated from the content of the trading ad and the type of the trading ad (e.g., client or provider) in such a way as to create likely unique keywords (in 2 ways—atypical words or non-words, and distinguished by ad type, e.g. so clients looking for providers don't bring up a lot of client ads) to aid in searching over huge document spaces, such as the WorldWideWeb. The metadata section allows arbitrary lists of name-value pairs, as well as some expression of the need or value of particular pieces of metadata.

The resource section is governed by its own ad author-specified DTD. Users and communities across the network, such as the WorldWideWeb, are able define their own DTDs for resources from CORBA IDL or Java components, to components that have natural language interfaces with advertised grammars to common objects like real estate, cars, gumdrops, house painters, and so forth. Because a wide variety of types of trading ads will from time to time be desirable, creators can choose the style or format of DTDs as desired. Resulting trading ads will have the same keywords-metadata-resource structure as shown in the Java RMI service ads example above, but the trading ad DTD will not grow to subsume all the resource DTDs within itself. Further, the structure allows resource DTD creation and management to be distributed amongst various entities.

Summarizing, the searchKeywords provides a mechanism to expose the otherwise hidden content of the trading ad to search engine crawlers in the case of WorldWideWeb-based ads (or to other possible search or indexing tools in the case of non-Web-based ads or otherwise), the metadata provides a place for free-form name-value pairs, and the resource provides a container for all the different things that can be advertised. The resource section typically holds more formalized data as compared to the metadata, such as API or type descriptions, or even license or cost sections, and could be standardized by national or international organizations. Unless and until standardization occurs, however, the free-form data should reside in the metadata section.

Trading Advertisement Locations

Because trading ads are textual documents, they are easily embedded in a wide variety of data objects. Perhaps the most useful data objects at present are HTML pages, however, the concepts apply equally to other data objects, for example, from MS Word docs to MPEG video bitstreams, and from JPEG images to application binaries. In any instance in which a format allows a section of text, a trading ad can be inserted directly in its original form. It is important to distinguish what comprises the trading ad and what does not, but the embedding medium must make the distinction clear. If the trading ad is transformed into another format, such as binary through encryption or some other process, then the trading ad in that form may be includable in an ever wider variety of data objects. In addition to the embedding of ads in variously and differently formatted data objects, trading ads are locatable in filesystems and databases. Moreover, trading ads are synthesizeable on the fly by a processor, such that the trading ads will only exist in memory or over a communications channel.

Although it is not significant to the concepts of the trader 50 how trading ads are indexed by search engines, such indexing is important in order for the trader 50 to properly operate to return trading ads. Conventionally, most search engines on the Internet locate WorldWideWeb pages via a conventional web crawler program that recursively follows the embedded URLs within a pre-determined set of seed pages. Many of the conventional publicly accessible search engines provide mechanisms, such as an e-mail address, to allow anyone to send URLs for consideration of indexing. With respect to the trader 50, Web pages, or other resources, as the case may be, containing advertisements must be indexed in some typical manner. One matter of note, however, is that the submitter of a network resource, such as an ad page, for indexing may not control whether the ad is indexed in timely manner or at all. Timeliness might not matter, for example, as in the case of telephone book Yellow Pages where the goal is just getting the ad in at some point so that it can be made available for a lengthy time period thereafter. There are other instances, however, where timeliness is important, for example, in the instance of want ads where one expects ads posted one minute, hour, or day to be available for answering the next minute, hour, or day. In such instance, a separate service (or services) adjunct to the trader 50 can provide the capability of incrementally indexing ads as soon as they arrive. In any event, the indexing mechanism can be based on conventional database management systems (DBMS) and information retrieval technology.

Finding Trading Advertisements

In the method 2 of finding appropriate trading advertisements, the trader 50 is handed a Query, the type of matching ads sought (i.e., client or provider), and optionally the maximum number of matching ads to return. The client performs the Query by calling the getMatches( ) method on the trader 50 object, which is a Java object that is either instantiated locally within the client program or remotely as a Java RMI object. If instantiated locally, the trader 50 code is bound to the client and is part of the client process. If instantiated remotely, the trader 50 is used like a Unix daemon or an NT service, with the trader 50 running as a separate process in the background on some host machine accessible to the client.

In order to fulfill a client's Query request, the trader 50 searches through the trading ads to which it has access and determines any matches from the trading ads that are found. The trader 50 has access to trading ads through one or more mechanisms—e.g., via search engines, databases, filesystems, memory stores, and other resources which access the trading ads where they reside on the network, for example, the Internet.

For example, in the case of a search engine as the ad finding mechanism, the trader 50 posts a query to the search engine based on query terms generated from the contents of the Query by the client (or provider, as the case may be). It is a goal of the method 2 and system 40 to generate a search engine query that can return a selection of relevant ad-embedded pages, yet minimize the return of non-relevant "noise" pages. A "TradingAd" term for the search engine query is, therefore, generated based on whether the trading ads so sought are client or provider ads and based on the particular name of the root element of the resource. For example, if searching for providers and given the Java RMI client ad in the XML examples hereinabove, the TradingAd term is "JavaRMI"+"Provider"+"TradingAd"= "JavaRMIProviderTradingAd". After the Trading Ad term is generated, the searchKeywords section is mined with a selection of keyword name-value pairs chosen (perhaps limited by string length or other considerations) and their "C" or "P" name pre-fixes (depending on whether they were client or provider ad search terms) replaced as needed to reflect their use as search terms to locate clients or providers. Additional or replacement search terms can be specified by the client, such are transmitted along with the original Query. Finally, a search engine query string is derived from these terms and pairs, by putting them all together into a single string using a query string syntax understood by the search engine employed by the trader 50 (e.g., Alta Vista, Hotbot, Excite, a local search engine, or others).

The trader 50 then submits this query to the search engine (typically, through an HTTP CGI transaction) and extracts a list of page URLs from the search engine response. The trader 50 then retrieves each page in turn and extracts any trading ads embedded in the page (a page may contain 0 to N ads). The trader 50, via the matcher 54, then determines if there is a match with any of the ads found and saves the ones that are matches. When a maximum number of matching ads is reached, or there are no more ads to be found, the trader 50 stops searching and returns the results of trading ad matches.

During the course of looking for trading ads under the method 2 and system 40, the trader 50 may come across trading ads for search engines, databases, filesystems, and others, as well as other traders, as these are all advertisable entities themselves. In these cases, the trader 50 can use these tradeable resources to extend its search for trading ads. This recursive use of tradable resources is very powerful. In the case of the trader 50 using other traders, recursion must be controlled. For example, without control, the original request can be propagated to other traders, which then propagate it to other traders and so forth, and soon perhaps even creating loops. If the domains of trading ads reachable by each of the other traders does not overlap, then there is not a redundant coverage problem, but there can be a halting problem—that is, there must be a mechanism to stop all the traders involved and not involve any more when the required number of trading and matches have been found. To avoid these and other problems, the default policy of the trader 50 is to use other traders only to search and match trading ads directly available to the original trader 50, and to not pass the original request to other traders or other ad searching resources. Those other traders and ad searching resources are passed back along with any matching ad results to the originating trader 50, and the original trader 50 determines which, if any, of the other resources will be used to further the trading ad search.

In effect, the scale (i.e., domain, enclave, portion of the information space) in which the trader 50 operates, from single host, to LAN, to WAN, to Intranet, to Extranet, to the WorldWideWeb, to the whole Internet and beyond, is determined by the scope of the ad search resources the trader 50 interrogates, unioned with the closure of all the other traders and ad search resources interoperable with it in the course of satisfying the client.

It is noteworthy that traders can specialize in the kinds of resources that they represent and return. For example, the trader 50, in any particular instance, can have deep knowledge about ocean-going vessels, for purposes of example, such that the trader 50 can make more than superficial use of the information contained in a client ad looking for sonar services from particular types of commercial fishing vessels. In such instance, the metadata section of the client ad can reference ship images, sonar waveform data, and satellite-based oceanographic surveys. A more generic trader doing string-based matching on metadata name-value pairs would not be capable of comprehending what the textual references actually point to, but such a specialized trader can in fact do just that, employing image understanding, waveform analysis, global mapping systems, or whatever other characteristics may be important, to more deeply compare client needs with provider offerings. Such a specialized trader fits nicely into the entire scheme, because the specialized trader in its own advertisement states its special capabilities. When some other trader comes across the specialized trader during a trading ad search, it is determinable that the special trader capabilities match well with the trading that is sought and better matches are possible via the specialized trades. This is a very powerful scheme, with great flexibility in allowing entities and resources of all sizes and strengths to utilize each other intelligently and efficiently in the trader universe.

Moreover, trading ads can represent virtual or compositional resources. For instance, some advertized data sources are virtual and provide a way to compose answers from other data sources. Similarly, ads can describe how to construct services from other simpler services and some sort of workflow, recipe, inference logic, or program. This latter capability allows traders to construct composed services based on these compositional ads.

Matching Trading Advertisements

In order to determine whether two trading ads (such as a client ad and a provider ad) are a good match, the trader 50 examines the metadata and resource sections of the respective ads. The searchKeywords are not considered, as they are redundant to the other ad sections and are really only useful in assisting the search engine queries in finding ads.

To determine the extent of matching between the metadata sections of a client and a provider ad, the trader 50 employs a scoring model. In an exemplary implementation, metadata items (i.e., mdata elements in the language of the DTD) are rated by the ad composer according to desirability, ranging from mandatory to no-special-consideration. These ratings are expressed in client ads, in order to influence the kinds of provider ads with which they best match, but they can alternatively by used by providers if a provider resource requires certain conditions from a client in order to interoperate or to do so well. In the case of mandatory metadata items, trading ads that do not include them do not match and so are not further considered by the trader 50, except perhaps in a debug mode where clients are trying to discover why they are not getting any matches. Metadata items rated higher in matching ads gain more points in the scoring model than items rated lower. After all of the metadata items between the client and provider ads have been examined, a numerical metadata match score accumulates. The score ranks the matches from best to worst match.

The case of the ordinary trader verses specialized trader shows up in the metadata matching. In the case of the ordinary trader, string matching is used to assess the matching of two metadata items. Either the strings for the name-value pairs match, garnering full points for that item, or they don't, garnering zero points. In the case of the specialized trader, string matching is initially used to determine matching of the two metadata items. If the strings match, full points are given. If the strings don't match, then the additional capabilities of the specialized trader become important, such as image understanding and the other special factors discussed above. It is the decision of the specialized trader, in light of its special factors, how many points to assign to any particular extent of match. Based on the extent of the match, from zero to full points could be scored. Instead of (or in addition to) the special factors of a particular implementation of a specialized trader, those and other special factors can be accounted for from code, for example, specified via the wtMatchCode element of the metadata section of the client ad.

Matching of resource sections is more involved. Because the resource sections are externally defined, the trader in any instance can have no intrinsic knowledge of the semantics of the XML elements and attributes that make up the resource definition. To deal with this, three different types of resource matching strategies are employed: default, with wtMatchSpec specs, and with custom code. In the default case, all of the elements and attributes found in the client ad are counted and, for each element or attribute present in the provider ad, one point is awarded to the resource match score.

Such default matching is at times not adequate, however, such as in the Java RMI example hereinabove. When searching for a particular Java RMI component, it can be important that the Java interfaces of the client and provider match more exactly than the matching provided for in the default case, e.g., the same number of methods (elements) must be defined on both sides and must have the same signatures (attributes). This can be accomplished, for example, through the use of wtMatchSpec attributes in the resource. The wtMatchSpecs can be hardcoded in the resource DTD (as in the DTDs of the hereinabove examples), or defined generically in the DTDs (such as via "wtMatchSpec CDATA #IMPLIED") and specifically in the ads on an ad-by-ad basis. The pattern for the wtMatchSpec values is "item1=spec1, . . . , itemN=specN", where items are element names (except with matchRef) and specs are from the set of valid wtMatchSpecs. The valid wtMatchSpecs are conventionally defined as:

matchEqual[EA]—there must be the same elements (and attributes if matchEqualEA) defined on both sides. EA stands for Elements and Attributes.

matchDefault—default matching on this element.

matchAtLeastN[EA] (where N=1, 2, 3 . . . )—insure at least N element (and attributes if matchAtLeastNEA) matches.

matchSkip—do not consider this element for matching purposes.

matchRef—the attribute is a reference such as a URL or URI that can be followed. If the reference points to a known document type such as XML DTD, XML Schema, RDF, or RDF Schema, then those documents can be compared for equivalence (as defined by XML or RDF) by the WebTrader in order to determine a match, if the references don't string match themselves. This mechanism is useful when the type of something is not or cannot be captured by something like a MIME type, and must be spelled out in a document definition. The datasource.dtd shown above uses this mechanism.

When the wtMatchSpec is applied to an element, it also applies to all the sub-elements defined for that element, unless overridden by other wtMatchSpecs defined on those sub-elements. Note that all the wtMatchSpecs except matchRef are ignored in the match candidates—it's the wtMatchSpecs in the ad for which matches are sought (the "client ad") and that drive the matching process. If a matchEqual, matchAtLeast, or matchRef type of wtMatchSpec fails with respect to any particular ad, then the ad is discarded, i.e., it is not considered similar enough for a match.

Finally, it can occur that neither the default or wtMatchSpecs matching strategies satisfy the matching requirements for particular resources. For these cases, custom code is utilizable (as in the metadata section) with the wtMatchCode element. In such instance, wtMatchCode either points to or includes code that takes as input the resource section strings of the client and provider ads and outputs a resource match score. A particular situation in which this could be useful is in trying to match CORBA IDL components to components of different languages, for example, the code can determine whether or not a Java client is interoperable with a CORBA service.

To determine the extent or quality of the match between resource sections of a client and a provider ad, traders can take an all or nothing stance, or they can accept differences to the extent the differences can be made invisible from the perspective of the client and provider. For example, in the all or nothing case, the interface sub-section of the JavaRMI service section must match exactly (except in the ordering of the methods—that is immaterial). If the match is not exact, then it is thrown out (like in the case of missing mandatory metadata items). Otherwise, the match is exact and is allowed to stand. In the case of differences, the trader can accept the differences between interfaces if the trader is capable of interjecting type converters or other machinery necessary to reconcile the interfaces in a way acceptably seamless to both the client and the provider.

The trader ranks the matches by using the resource match score as the primary key and the metadata match score as the secondary key. The resource is the element of primary importance in a trading ad and within a particular resource class resources can be graded by their metadata matching quality. When any particular trader asks for matches from other traders, those other traders themselves rank the results that they find. Given the nature of the trader scoring model, the originating trader merely merges these other-trader results and re-sorts them based on their scores, in order to get a single, overall ranking for all of the results.

Using Trader Results

When the trader 50 has finished its searching, matching, and ranking of trading ads, the trader 50 is ready to return its results to the client 48. The trader 50 can return the content of the resource section of ads as text strings, according to selections by the client. The trader 50 client software provides the client the ability to extract the values of named elements and attributes from the resources, so that, for example, service connection addresses or data source access methods can be easily obtained. These latter entities are what the client uses to actually interoperate with Web-based resources, such as services or data sources, be it a remote Java RMI object that it connects to, an HTPP CGI script that it calls, or an Oracle database that it queries.

If at some point the client decides that a resource or connection to a resource has degraded or died or just needs to be changed for some reason, the client can re-bind to one of the other match results the trader 50 returned or ask the trader 50 for new matches. Alternately, the trader 50 can assume responsibility for maintaining this binding (i.e., monitoring and re-binding, if necessary). This function can, for example, be supplied by a more comprehensive survivability service that makes use of the trader 50.

DeepSearch

Alternatives and additions to the foregoing include "DeepSearch". DeepSearch is a trader-based standalone web search tool. It uses the trader 50, or some other trader, to find websites that advertise their local site search engines, and matches those engines with the sites found in a web search made through an ordinary search engine, such as Excite, Yahoo, or Google. Then, the original query is submitted to the matched local search engines and those results presented as sub-results of the original ordinary query results. The DeepSearch can go one-level deep, or its process can be applied recursively to sub-results as long as embedded search engines are found. The advantage of DeepSearch is that it potentially reaches deeper than queries to ordinary search engines, as typically the pages indexed by local site search engines are not indexed by the big global engines.

It is to be understood that multiple variations, changes and modifications are possible in the aforementioned embodiments of the invention. Although illustrative embodiments of the invention have been shown and described, a wide variety of modification, change and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A system for finding a trading ad, on a network, comprising:
   a query-sending remote resource;
   a query-receiving trader, connected over the network to the remote resource;
   a query string devised by the trader;
   a search engine, connected to the network, for receiving the query string from the trader, over the network; and
   a trading ad, accessible over the network, and findable by the search engine, based on the query string;
   wherein the trading ad is a typed XML document contained within a World Wide Web page of the Internet that is selected from the group consisting of an HTML document, an SML document, an RDF document, and a plaintext document; and
   wherein the trading ad is an object having appropriately and desiredly attributed services or functions and the object is selected from the group consisting of: atomic operation, sequence of operations, set of operations, and non-operational.

2. The system of claim 1, wherein the trading ad is contained in a resource other than a World Wide Web page.

3. A system for finding a trading ad, on a network, comprising:
   a query-sending remote resource;
   a query-receiving trader, connected over the network to the remote resource;
   a query string devised by the trader;
   a search engine, connected to the network, for receiving the query string from the trader, over the network; and
   a trading ad, accessible over the network, and findable by the search engine, based on the query string;
   wherein the trading ad is contained in a resource other than a World Wide Web page; and
   wherein the resource is selected from the group consisting of an MPEG bitstream, a Microsoft Word document, a JPEG image, a software program, and a data object; and
   wherein the trading ad is an object having appropriately and desiredly attributed services or functions and the object is selected from the group consisting of: atomic operation, sequence of operations, set of operations, and non-operational.

\* \* \* \* \*

UNITED STATES PATENT AND TRADEMARK OFFICE
CERTIFICATE OF CORRECTION

| | |
|---|---|
| PATENT NO. | : 6,963,863 B1 |
| APPLICATION NO. | : 09/407555 |
| DATED | : November 8, 2005 |
| INVENTOR(S) | : Thomas Bannon |

It is certified that error appears in the above-identified patent and that said Letters Patent is hereby corrected as shown below:

Column 1, Line 3 should read --This invention was made with Government support under Contract F30602-98-C-0159 awarded by the Air Force. The Government has certain rights in this invention.--

Signed and Sealed this

Nineteenth Day of December, 2006

JON W. DUDAS
*Director of the United States Patent and Trademark Office*